No. 757,866. PATENTED APR. 19, 1904.
E. HAIMAN.
SWINGLETREE OR DOUBLETREE.
APPLICATION FILED JAN. 15, 1904.
NO MODEL.
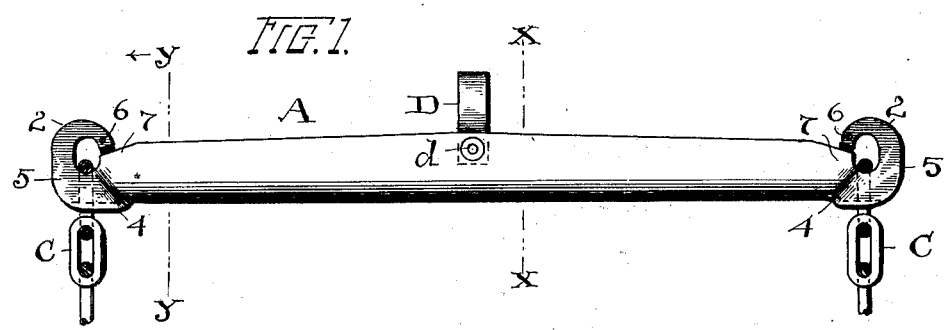
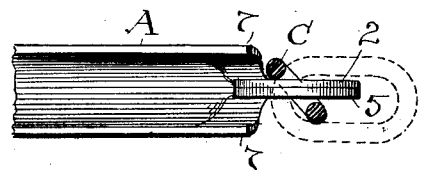
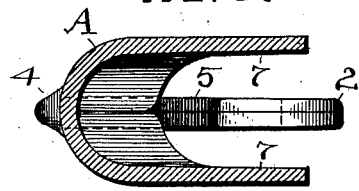
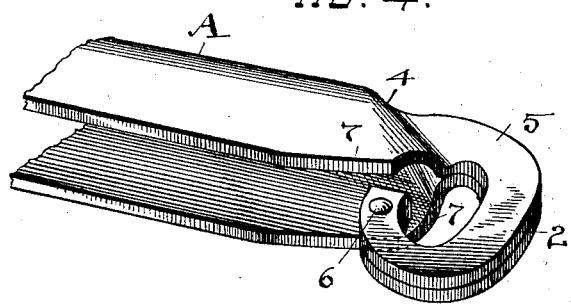
WITNESSES:
R. B. Moser
A. N. Moser
INVENTOR.
Elias Haiman
BY H. T. Fisher
ATTORNEY.

No. 757,866. Patented April 19, 1904.

UNITED STATES PATENT OFFICE.

ELIAS HAIMAN, OF CLEVELAND, OHIO.

SWINGLETREE OR DOUBLETREE.

SPECIFICATION forming part of Letters Patent No. 757,866, dated April 19, 1904.

Application filed January 15, 1904. Serial No. 189,092. (No model.)

*To all whom it may concern:*

Be it known that I, ELIAS HAIMAN, a citizen of the United States, residing at Cleveland, in the county of Cuyahoga and State of Ohio, have invented certain new and useful Improvements in Swingletrees or Doubletrees; and I do declare that the following is a full, clear, and exact description of the invention, which will enable others skilled in the art to which it appertains to make and use the same.

My invention relates to swingletrees and doubletrees; and the object of the invention is to provide a sheet-metal tree or bar for draft purposes, either single or double, as may be wanted, and which is provided with integral hooks at its ends and constructed wholly in one piece, substantially as shown and described, and particularly pointed out in the claims.

In the accompanying drawings, Figure 1 is a plan view of what may be regarded as a swingletree or doubletree, the only difference in any case being one of size. Fig. 2 is an enlarged end view of the tree or bar looking from the rear; and Fig. 3 is a cross-section, enlarged, on line Y Y, Fig. 1. Fig. 4 is a perspective view of one end of the tree or bar corresponding to Fig. 1. Fig. 5 is a cross-section on line X X, Fig. 1.

The invention as thus shown belongs to the class in which both swingletrees and doubletrees are developed from a piece of sheet metal, usually steel, and which is first cut to the requisite size and shape by means of suitable dies and then bent lengthwise, in its body portion particularly, to a substantially U shape in cross-section. Ordinarily and in this instance the part A, referred to as a bar or tree, has the proportional cross-sectional depth and width of body substantially as shown; but there may be still more metal thrown into the middle portion of the tree, if desired, and the ends are cut to the requisite shape to form the reversely or rearwardly curved hooks 2, substantially as shown. These hooks are especially designed to prevent possible accidental disconnecting or releasing of the traces or trace-chains C when they are slack and ordinarily would be liable to get loose, and the construction or shape of said hooks and their relation to the body of the tree is such as to absolutely prevent release of the traces by accident or otherwise except as purposely released by hand. To this end the said hooks are made double or double-sided, bringing one side or portion from each corresponding side of the tree, and each side is an independent portion until the two are brought together to form a single hook, as shown. To do this, the extremities of the body of the tree are compressed or contracted in their rear portion, as seen at 4, so as to form the flat-sided solid shank 5 of the hook where the draft or pull occurs through traces or chains C. The contracting or bringing together of the tree at this point is not so abrupt as to strain the metal and serves rather to give it strength and fortify the hook and body at the point of greatest strain, and the strength of the hook is all that can possibly be needed to meet the demands of the draft as well as to permit wear by continued usage. From the immediate draft portion 5 of the hook the remaining portion curves around to the rear of the tree and the point or end thereof has a rivet 6, connecting its two sides, and it lies in such relation to the adjacent edges 7 of the body that in plan they are in substantially the same plane, Fig. 1, while horizontally the point lies equally between said edges. Then in addition the hook is of such thickness, taking the two sides thereof together, and the edges 7 of the body are so near thereto relatively, Fig. 2, that the chain or trace C cannot be detached without inclining the engaged link, as seen in Fig. 2; but having the link inclined and presumably of the usual size and kind the link is released by sliding it off the point of the hook into the space between edges or sides 7 of the body, and this release occurs not only opposite the point of draft to the rear, but at one side therefrom inward within the sides of the tree and by inclining the link in addition. Obviously this makes a connection which is proof against accidental release and from which it is practically impossible that release should occur except by hand.

At its middle the tree has a fixed link or clevis D, engaged by a rivet *d* through the flattened ends thereof and sides of the tree, and the said overlapped ends of the link fill the space between the sides of the tree, as shown, and serve to promote strength at this point, as well as affording connection for draft purposes.

What I claim is—

1. As a new article of manufacture, a draft-bar, such as a swingletree or doubletree, the same formed from sheet metal bent into substantially U shape in cross-section and having integral hooks at its ends with their extremities in substantially the same vertical plane as the rear edges of the bar and midway between the planes of said edges horizontally, substantially as described.

2. A swingletree or doubletree of substantially U shape in cross-section and having double-sided hooks at each end integral with the respective sides of the tree and the extremities of said hooks terminating at the rear of the tree and substantially equidistant from the adjacent edges thereof and relatively between the planes of said edges, substantially as described.

3. A swingletree or doubletree formed of sheet metal in substantially U shape in cross-section and having integral hooks at each end, the ends of the body of the tree being contracted at the base of the hook and the point of the hook lying substantially midway between the rear edges of the tree behind said contracted portion, substantially as described.

4. A swingletree or doubletree of sheet metal and substantially U shape in cross-section, the ends of the tree having hooks bent around from the front to the rear thereof and lying in a plane midway between the planes of the sides of the tree horizontally, said hooks formed each of two parts lying flat upon each other and fastened together at their extremity, substantially as described.

5. A swingletree or doubletree of sheet metal substantially U shape in cross-section and having reversely-curved integral hooks at each end, and a link midway the length of the tree having flattened ends pressed together and filling the space between the sides of the tree, and a rivet locking said link and tree together, thereby securing said link and strengthening the tree, substantially as described.

6. A whiffletree of substantially U shape in cross-section and having its extremities flattened and formed into hooks, said hooks being reversely curved from the front rearward and the points of the hooks extending toward the rear of the whiffletree, substantially as described.

In testimony whereof I sign this specification in the presence of two witnesses.

ELIAS HAIMAN.

Witnesses:
R. B. MOSER,
C. A. SELL.